(12) United States Patent
Suzuki et al.

(10) Patent No.: US 6,869,724 B2
(45) Date of Patent: Mar. 22, 2005

(54) NON-AQUEOUS ELECTROLYTE SECONDARY BATTERY AND POSITIVE ELECTRODE FOR THE SAME

(75) Inventors: Kohei Suzuki, Yao (JP); Kazunori Kubota, Moriguchi (JP); Akira Kuroda, Hirakata (JP); Motoi Kawamura, Kadoma (JP); Masao Fukunaga, Osaka (JP); Tsumoru Ohata, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 187 days.

(21) Appl. No.: 09/915,946

(22) Filed: Jul. 26, 2001

(65) Prior Publication Data

US 2002/0037450 A1 Mar. 28, 2002

(30) Foreign Application Priority Data

Aug. 8, 2000 (JP) ........................................ 2000-239351
Oct. 11, 2000 (JP) ........................................ 2000-310765

(51) Int. Cl.$^7$ ........................ H01M 10/04; H01M 4/48; H01M 4/62
(52) U.S. Cl. ...................... 429/94; 429/217; 429/231.1; 429/232
(58) Field of Search ...................... 429/94, 217, 231.1, 429/231.2, 231.3, 232

(56) References Cited

U.S. PATENT DOCUMENTS

| | | | | |
|---|---|---|---|---|
| 5,595,841 | A | * | 1/1997 | Suzuki ........................ 429/217 |
| 6,444,351 | B1 | * | 9/2002 | Goto ............................ 429/94 |
| 6,458,487 | B1 | * | 10/2002 | Takeuchi et al. ...... 429/231.1 X |
| 2002/0022175 | A1 | * | 2/2002 | Hallifax et al. ............... 429/94 |

FOREIGN PATENT DOCUMENTS

| | | |
|---|---|---|
| JP | 03-225761 | 10/1991 |
| JP | 04-162357 | 6/1992 |
| JP | 04462357 A | 6/1992 |
| JP | 07-029600 | 1/1995 |
| JP | 08-007881 | 1/1996 |
| JP | 08-287915 | 11/1996 |
| JP | 09-219199 | 8/1997 |
| JP | 10-261415 | 9/1998 |
| JP | 11025956 A | 1/1999 |
| JP | 11-233115 | 8/1999 |
| JP | 11-260327 | 9/1999 |
| JP | 11-288716 | 10/1999 |
| JP | 11-339839 | 12/1999 |
| JP | 2000-048805 | 2/2000 |

OTHER PUBLICATIONS

Internet Page: http://www.bartleby.com/61/71/S048710.html The American Heritage Dictionary of the English Language, Fourth Edition (2000) Date on Web: Mar. 8, 2001.*

(List continued on next page.)

*Primary Examiner*—Stephen J. Kalafut
(74) *Attorney, Agent, or Firm*—Akin Gump Strauss Hauer & Feld, LLP (57) ABSTRACT

A non-aqueous electrolyte secondary battery comprises: a positive electrode sheet comprising a positive electrode mixture containing a lithium-containing transition metal oxide as an active material and a particulate binder; a negative electrode sheet comprising a negative electrode mixture containing a carbon material; a separator interposed between the positive electrode sheet and the negative electrode sheet; and a non-aqueous electrolyte containing a lithium salt, wherein the positive electrode sheet and the negative electrode sheet are wound with the separator interposed therebetween to form an electrode assembly, and the positive electrode mixture has an active material density of 3.0 to 4.0 g/ml. The battery has a long life, high energy density and high output.

10 Claims, 3 Drawing Sheets

OTHER PUBLICATIONS

Kim et al. "Effect of pH on the Synthesis of LiCoO2 with Malonic Acid and Its Charge/Discharge Behavior for a Lithium Secondary Battery" Bull. Korean Chem. Soc., vol. 21, No. 11, pp. 1125–1132 (2000, month unknown).*

English translation of 08–007,881 (Umeda et al.), from the Japanese patent office (Jan., 1996).*

English translation of 2000–048,805 (Matsuo et al.), from the Japanese patent office (Feb., 2000).*

* cited by examiner

NON-AQUEOUS ELECTROLYTE SECONDARY BATTERY AND POSITIVE ELECTRODE FOR THE SAME

BACKGROUND OF THE INVENTION

In non-aqueous electrolyte secondary batteries used as electric power sources for portable electronic equipments, the positive electrode includes a lithium-containing transition metal oxide as an active material, while the negative electrode includes a carbon material capable of absorbing and desorbing lithium.

The positive electrode mixture includes an active material and a binder for binding active material particles together. The positive electrode mixture may further include a conductive agent, a thickening agent for facilitating formation of the electrode, or the like. The positive electrode sheet is produced by applying such a positive electrode mixture to a core member made of metal foil or the like.

As the binder, polyvinylidene difluoride (hereinafter referred to as PVDF), polytetrafluoroethylene (hereinafter referred to as PTFE), or modified acrylic rubber dispersed in water, for example, is used, as disclosed in Japanese Laid-Open Patent Publication No. Hei 11-25956.

The positive electrode mixture, however, is often mixed with an organic solvent and then applied to the core member. Thus, the modified acrylic rubber dispersed in water is not commonly used, since inclusion of water in the positive electrode mixture causes gas evolution inside the battery.

PVDF dissolved in the organic solvent tends to coat particles of the active material and the conductive agent, so that PVDF is not distributed effectively between these particles. In order to bind the particles of the active material sufficiently, a large amount of PVDF, for example, 2 to 5 parts by weight of PVDF, is necessary per 100 parts by weight of the active material.

On the other hand, PTFE maintains its particulate form in the organic solvent, but in the manufacturing process of the positive electrode plate, it is subjected to shearing force in rolling process, thereby to produce fibrils. In this case, PTFE functions as the binder when a large amount of the fibrils become entangled with the particles of the active material and the conductive agent. Therefore, a large amount of PTFE is also required for binding the particles.

However, when a large amount of the binder is contained in the positive electrode mixture, the weight of the active material contained in the unit volume of the mixture, that is, active material density, is decreased, so that the capacity of the electrode is decreased. The increase of the binder also results in reduction in porosity of the electrode, thereby lowering the output of the battery.

The use of a large amount of the binder further presents a problem that a large amount of the conductive agent is required in order to ensure that the positive electrode has sufficient electronic conductivity. For example, in case of using polyacrylonitrile dissolved in formaldehyde as the binder, 4 or more parts by weight of the conductive agent becomes necessary per 100 parts by weight of the active material, as disclosed in Japanese Patent No. 3046055. In order to increase the active material density of the positive electrode, however, it is desired to reduce the amount of the conductive agent as well.

On the other hand, when the amount of the binder is reduced in the positive electrode mixture to raise the active material density, it becomes difficult to process the positive electrode mixture. For example, the positive electrode mixture comes off from the core member during the manufacturing process. Therefore, it is difficult to fabricate a wound electrode assembly by using a positive electrode sheet comprising a positive electrode mixture having a high active material density of 3.0 g/ml and over. Further, when the active material density is raised, the strength of the positive electrode is deteriorated, which makes life characteristics of the battery insufficient.

BRIEF SUMMARY OF THE INVENTION

The present invention aims to provide a non-aqueous electrolyte secondary battery having a long life, high energy density and high output by using a positive electrode sheet having a high active material density and an excellent processing workability.

The present invention relates to a non-aqueous electrolyte secondary battery comprising: a positive electrode sheet comprising a positive electrode mixture containing a lithium-containing transition metal oxide as an active material and a particulate binder; a negative electrode sheet comprising a negative electrode mixture containing a carbon material; a separator interposed between the positive electrode sheet and the negative electrode sheet; and a non-aqueous electrolyte containing a lithium salt, wherein the positive electrode sheet and the negative electrode sheet are wound with the separator interposed therebetween to form an electrode assembly, and the positive electrode mixture has an active material density of 3.0 to 4.0 g/ml.

Figure 1:
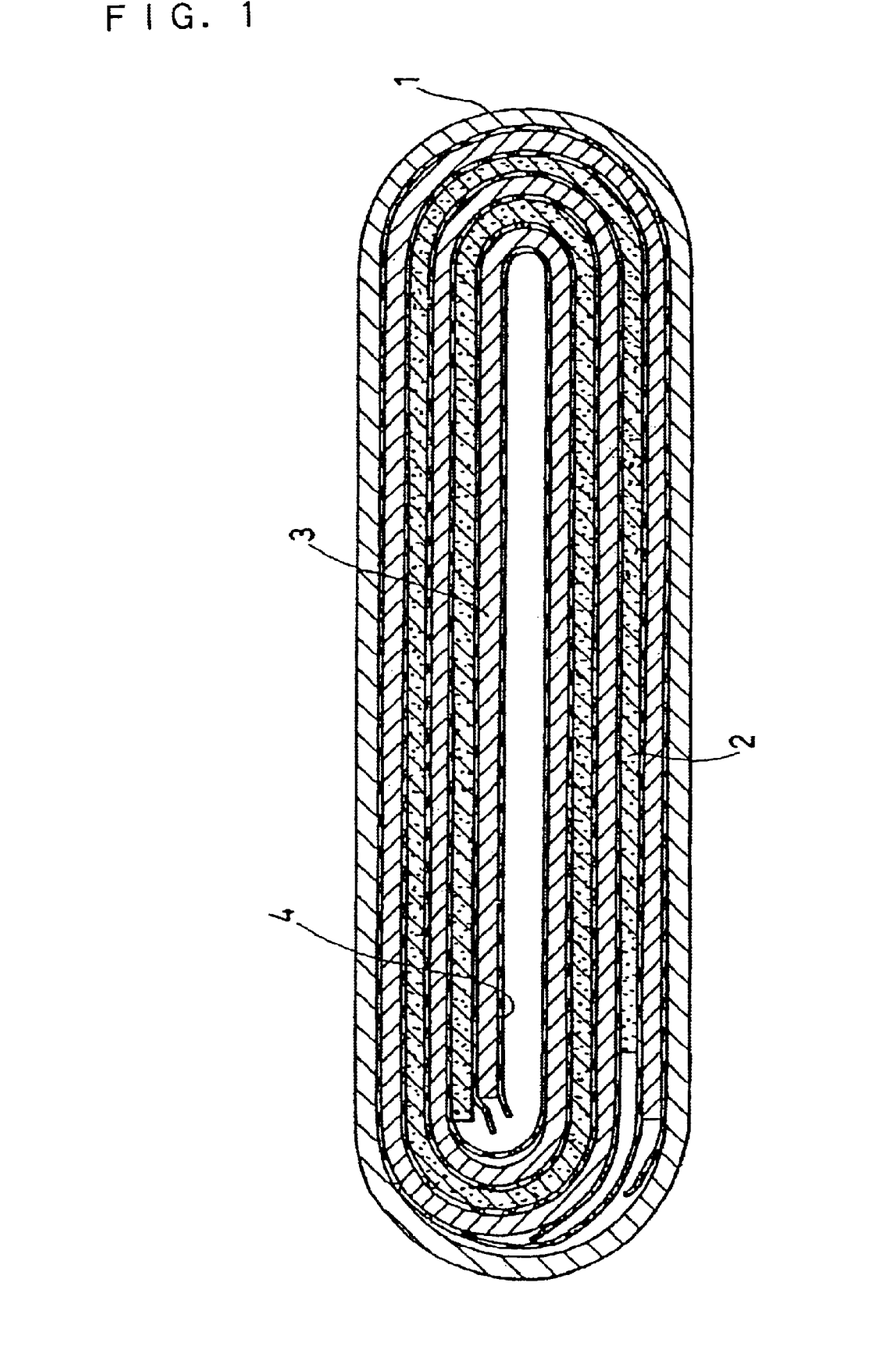
FIG. 1 is a transverse-sectional view illustrating an example of a non-aqueous electrolyte secondary battery in accordance with the present invention.

It is preferable that the electrode assembly has a substantially elliptic transverse-section. Herein, the transverse-section refers to a section which would be seen when the electrode assembly was cut along the plane parallel to the winding direction of the electrode assembly. The substantially elliptic shape may also include such a shape as shown in FIG. 1 which will be described later, a shape of rectangle with two shorter sides thereof swollen up like an arc.

It is further preferable that the ratio of the longer axis to the shorter axis in the substantially elliptic transverse-section is 4 to 10.

It is also preferable that the particulate binder is an elastic copolymer comprising a 2-ethylhexylacrylate unit, an acrylic acid unit, and an acrylonitrile unit. The particulate binder may also have a cross-linked structure.

It is further preferable that in an absorption spectrum obtained by an FT-IR spectrometry of the elastic copolymer, the intensity of the absorption peak attributed to C=O stretching vibration in the 2-ethylhexylacrylate unit and the acrylic acid unit is 3 to 50 times the intensity of the absorption peak attributed to C≡N stretching vibration in the acrylonitrile unit. Herein, the intensities of the absorption peaks refer to the heights of the absorption peaks from the base line of the spectrum.

It is also preferable that the positive electrode mixture contains 0.4 to 2 parts by weight of the particulate binder per 100 parts by weight of the lithium-containing transition metal oxide.

It is further preferable that the positive electrode mixture further contains not less than 2 and less than 4 parts by weight of a conductive agent comprising graphite (A) and carbon black (B) per 100 parts by weight of the lithium-containing transition metal oxide, and that the weight ratio of (A)/(B) in the conductive agent is 20/80 to 80/20.

The positive electrode mixture may further contain a thickening agent having a polyethylene structure.

The present invention also relates to a positive electrode for a non-aqueous electrolyte secondary battery comprising a positive electrode mixture containing 100 parts by weight of a lithium-containing transition metal oxide, 0.4 to 2 parts by weight of a particulate binder, and not less than 2 and less than 4 parts by weight of a conductive agent, wherein the positive electrode mixture has an active material density of 3.0 to 4.0 g/ml, the conductive agent comprises graphite (A) and carbon black (B), and the weight ratio of (A)/(B) is 20/80 to 80/20.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

The non-aqueous electrolyte secondary battery in accordance with the present invention has an electrode assembly in which a positive electrode sheet and a negative electrode sheet are wound with a separator interposed therebetween. The positive electrode sheet comprises a positive electrode mixture and a core member. The positive electrode mixture contains an active material and a particulate binder, and it may further contain a thickening agent and/or a conductive agent in some cases. The particulate binder is required to be insoluble in a dispersion medium of the positive electrode mixture.

The particulate binder which maintains its particulate form in the dispersion medium is distributed effectively between particles of the active material, between particles of the active material and the conductive agent, and between particles of the conductive agent in the positive electrode mixture. Thus, the particle surfaces of the active material and the conductive agent are prevented from being covered with the binder in the positive electrode mixture. Also, owing to the effective distribution of the particulate binder, the particulate binder can function sufficiently as the binder even in a small amount.

When a small amount of the binder is contained in the positive electrode mixture, the amount of the conductive agent can be reduced. As a result, the active material density of the positive electrode mixture can be increased without impairing life characteristics of the battery.

In the non-aqueous electrolyte secondary battery in accordance with the present invention, the positive electrode mixture has an active material density of 3.0 to 4.0 g/ml. The active material density is expressed as the weight (g) of lithium-containing transition metal oxide, which is an active material, contained in the unit volume (ml) of the positive electrode mixture.

If the active material density is less than 3.0 g/ml, the positive electrode fails to have a sufficient conductivity, so that the life of the battery is shortened. If the active material density exceeds 4.0 g/ml, on the other hand, the positive electrode becomes prone to collapse. It is particularly preferable that the active material density is 3.4 to 3.7 g/ml since the conductivity and the strength of the positive electrode are well balanced in this range.

The active material density, however, varies depending on the conditions under which the positive electrode is rolled after the positive electrode mixture is applied to the core member, even if the positive electrode mixture has the same composition. The thinner the positive electrode is rolled into, the more advantageous it becomes to produce small-sized batteries and the higher the active material density becomes.

As the lithium-containing transition metal oxide, $LiCoO_2$, $LiNiO_2$, $LiMnO_2$, $LiMn_2O_4$, and $Li[Li_xMn_{2-x}]O_4$ ($0 \leq x \leq 0.18$), for example, may be used. These may be used alone or in combination of two or more of them.

As the particulate binder, it is possible to use an elastic copolymer comprising a 2-ethylhexylacrylate unit, an acrylic acid unit and an acrylonitrile unit which is dispersed in an organic solvent, a tetrafluoroethylene-hexafluoropropylene copolymer (hereinafter referred to as FEP) which is dispersed in water, or the like. FEP needs to be heated at around 250° C. in order to function as the binder. Among them, it is preferable to use the elastic copolymer comprising a 2-ethylhexylacrylate unit, an acrylic acid unit and an acrylonitrile unit which needs no heating and contains no water.

It is particularly preferable that the elastic copolymer is a core-shell type rubber particle composed of a core comprising an acrylonitrile unit and a flexible shell comprising a 2-ethylhexylacrylate unit. Such core-shell type particle can maintain its particulate form even in the positive electrode since it has a solid core. The shell has the binding ability.

In an absorption spectrum obtained by an FT-IR spectrometry of the elastic copolymer, in view of the balance between the stickiness and the elasticity of the binder, the intensity of the absorption peak attributed to the C=O stretching vibration in the 2-ethylhexylacrylate unit and the acrylic acid unit is preferably 3 to 50 times the intensity of the absorption peak attributed to the C≡N stretching vibration in the acrylonitrile unit. If the intensity attributed to the C=O stretching vibration is less than 3 times the intensity attributed to the C≡N stretching vibration, the binding ability of the binder is deteriorated. If the intensity is more than 50 times, on the other hand, the rubber-like elasticity of the binder is insufficient, so that the strength of the positive electrode is lowered.

In the FT-IR spectrometry of the particulate binder, the absorption spectrum may be obtained by using a sample prepared by applying the particulate binder on a KBr plate.

In general, the absorption peak attributed to the C=O stretching vibration in the 2-ethylhexylacrylate unit and the acrylic acid unit is observed near 1700 to 1760 $cm^{-1}$. Also, the absorption peak attributed to the C≡N stretching vibration in the acrylonitrile unit is observed near 2200 to 2280 $cm^{-1}$.

The particulate binder is available in a form of a dispersion comprising the binder and a dispersion medium such as water or an organic solvent. As the dispersion medium, the organic solvent is preferably used. An example of the organic solvent preferably used is N-methyl-2-pyrrolidone.

The mean particle size of the particulate binder is preferably 0.05 to 0.3 μm, since a positive electrode which is well balanced in binding ability, active material density and porosity can be obtained in this range.

The amount of the particulate binder in the positive electrode mixture is preferably 0.4 to 2 parts by weight per 100 parts by weight of the positive electrode active material. If the amount of the particulate binder is less than 0.4 part by weight, the binding ability is reduced. If the amount exceeds 2 parts by weight, on the other hand, the porosity of the positive electrode is lowered, thereby resulting in deterioration of the function of the positive electrode.

As the thickening agent, it is possible to use cellulose type thickening agents such as carboxymethyl cellulose or thickening agents having a polyethylene structure such as a copolymer comprising an ethylene unit and a vinyl alcohol unit. These may be used alone or in combination of two or more of them.

When the above-mentioned elastic copolymer is used as the binder, the copolymer comprising an ethylene unit and a vinyl alcohol unit is preferable as the thickening agent since it is well soluble in N-methyl-2-pyrrolidone, which is the dispersion medium of the elastic copolymer.

When FEP is used as the binder, carboxymethyl cellulose is preferable as the thickening agent since it is well soluble in water which is the dispersion medium of FEP.

The ethylene-vinyl alcohol copolymer preferably contains 10 to 90 mol % ethylene unit and 10 to 90 mol % vinyl alcohol unit.

The ethylene-vinyl alcohol copolymer can be obtained by saponifying an ethylene-vinylacetate copolymer.

The amount of the thickening agent in the positive electrode mixture is preferably 0.1 to 1 part by weight per 100 parts by weight of the positive electrode active material. If this amount is less than 0.1 part by weight, application of the positive electrode mixture to the core member becomes difficult. If the amount exceeds 1 part by weight, on the other hand, a great deal of the active material particles are covered with the thickening agent, so that the function of the positive electrode is deteriorated.

The conductive agent preferably comprises graphite (A) and carbon black (B). The graphite (A), of which particle size is comparatively large, is considered to form an electrical connection mainly between the active material and the core member in the positive electrode, while the carbon black (B), of which particle size is comparatively small, is considered to form an electrical connection mainly between the particles of the active material in the positive electrode. Therefore, in the positive electrode including only one of the graphite and the carbon black, a close electroconductive network is difficult to be formed.

In order for a small amount of the conductive agent to form the close electroconductive network in the positive electrode, the weight ratio of (A)/(B) in the conductive agent is preferably 20/80 to 80/20.

The mean particle size of graphite (A) is preferably 0.1 to 10 $\mu$m, since a favorable electroconductive network can be formed in this range. The mean particle size of carbon black (B) is preferably 0.01 to 0.1 $\mu$m also for formation of the favorable electroconductive network.

The ratio of the mean particle size of graphite (A) to the mean particle size of carbon black (B) is preferably 2 to 1000.

An artificial graphite, such as vapor-phase growth graphite or expanded graphite, and a natural graphite, such as flaky graphite, may be used as the graphite (A).

Acetylene black, furnace black or the like may be used as the carbon black (B).

The amount of the conductive agent in the positive electrode mixture is preferably 2 to 7 parts by weight, more preferably not less than 2 and less than 4 parts by weight, per 100 parts by weight of the positive electrode active material. If this amount is less than 2 parts by weight, the electroconductive network is difficult to be formed sufficiently in the positive electrode. If the amount exceeds 7 parts by weight, on the other hand, the positive electrode is prone to crack, resulting in deterioration of the function of the positive electrode. Also, in order to increase the active material density and further improve the function of the positive electrode, the amount of the conductive agent is preferably less than 4 parts by weight.

Since the positive electrode of the present invention contains the particulate binder, the porosity thereof is prevented from becoming too small and thus the affinity thereof to the non-aqueous electrolyte is excellent. The permeability of the non-aqueous electrolyte into the positive electrode can be evaluated by observing the contact angle between the surface of the positive electrode and the non-aqueous electrolyte. The value of the contact angle is preferably 10 to 30° although the value varies depending on the kind of the non-aqueous electrolyte and active material density, for example. If the contact angle is too small, the positive electrode absorbs the non-aqueous electrolyte so excessively that the high-rate discharge characteristic of the battery becomes insufficient. If the contact angle is too large, on the other hand, the positive electrode hardly absorbs the non-aqueous electrolyte. In this case, also, the high-rate discharge characteristic of the battery becomes insufficient.

The positive electrode sheet is produced by applying the positive electrode mixture to both surfaces of the core member made of metal foil, lath metal plate or the like, rolling the resultant member, and cutting the rolled member. From the viewpoint of reduction in size and weight of the battery, the thickness of the metal foil is about 10 to 25 $\mu$m, the thickness of the lath metal plate is about 10 to 50 $\mu$m, and the thickness of the positive electrode is about 80 to 200 $\mu$m.

The negative electrode sheet is produced by applying a negative electrode mixture, which includes a carbon material as an active material, to both surfaces of a core member, rolling the resultant member, and cutting the rolled member. As the core member, a metal foil or a lath metal plate, each having the similar thickness as that in the positive electrode, is used. The thickness of the negative electrode is about 80 to 200 $\mu$m.

The positive electrode sheet and the negative electrode sheet are wound with a separator interposed therebetween, to form an electrode assembly. As the separator, a polyethylene micro-porous film, for example, having a thickness of 10 to 40 $\mu$m, is used.

In the case of producing a rectangular battery, the wound electrode assembly is compressed in diametrical direction to obtain a substantially elliptic transverse-section. At this time, the ratio of the longer axis to the shorter axis in the substantially elliptic transverse-section is normally 4 or higher. The positive electrode of the present invention, which includes the particulate binder functioning effectively even in a small amount, has a high active material density. However, according to the present invention, it is possible to make the ratio of the longer axis to the shorter axis in the substantially elliptic transverse-section 6 to 10 without impairing the strength of the positive electrode.

FIG. 1 is a transverse-sectional view illustrating an example of a non-aqueous electrolyte secondary battery in accordance with the present invention. A substantially elliptical battery case 1 is charged with a flat electrode assembly. The electrode assembly is obtained by winding a positive electrode sheet 2 and a negative electrode sheet 3 with a separator 4 interposed therebetween and compressing the wound assembly in diametrical dimension.

In the present invention, it is possible to use a non-aqueous electrolyte comprising a lithium salt and a non-aqueous solvent, which is conventionally used for lithium ion secondary batteries or the like.

Examples of such lithium salt include $LiPF_6$ and $LiBF_4$. These may be used alone or in combination of two or more of them.

Examples of such non-aqueous solvent include ethylene carbonate, dimethyl carbonate, diethyl carbonate, ethylmethyl carbonate, and propylene carbonate. These may be used alone or in combination of two or more of them.

In the following, the present invention will be further described by way of examples. Such examples, however, are not to be construed as limiting in any way the scope of the present invention.

EXAMPLE 1

One hundred parts by weight of the active material $LiCoO_2$, 0.5 part by weight of a particulate binder having a mean particle size of 0.2 μm, 0.3 part by weight of a thickening agent, 2 parts by weight of acetylene black, 2 parts by weight of flaky graphite, and a proper amount of N-methyl-2-pyrrolidone were blended together, to obtain a positive electrode mixture paste.

Figure 2:
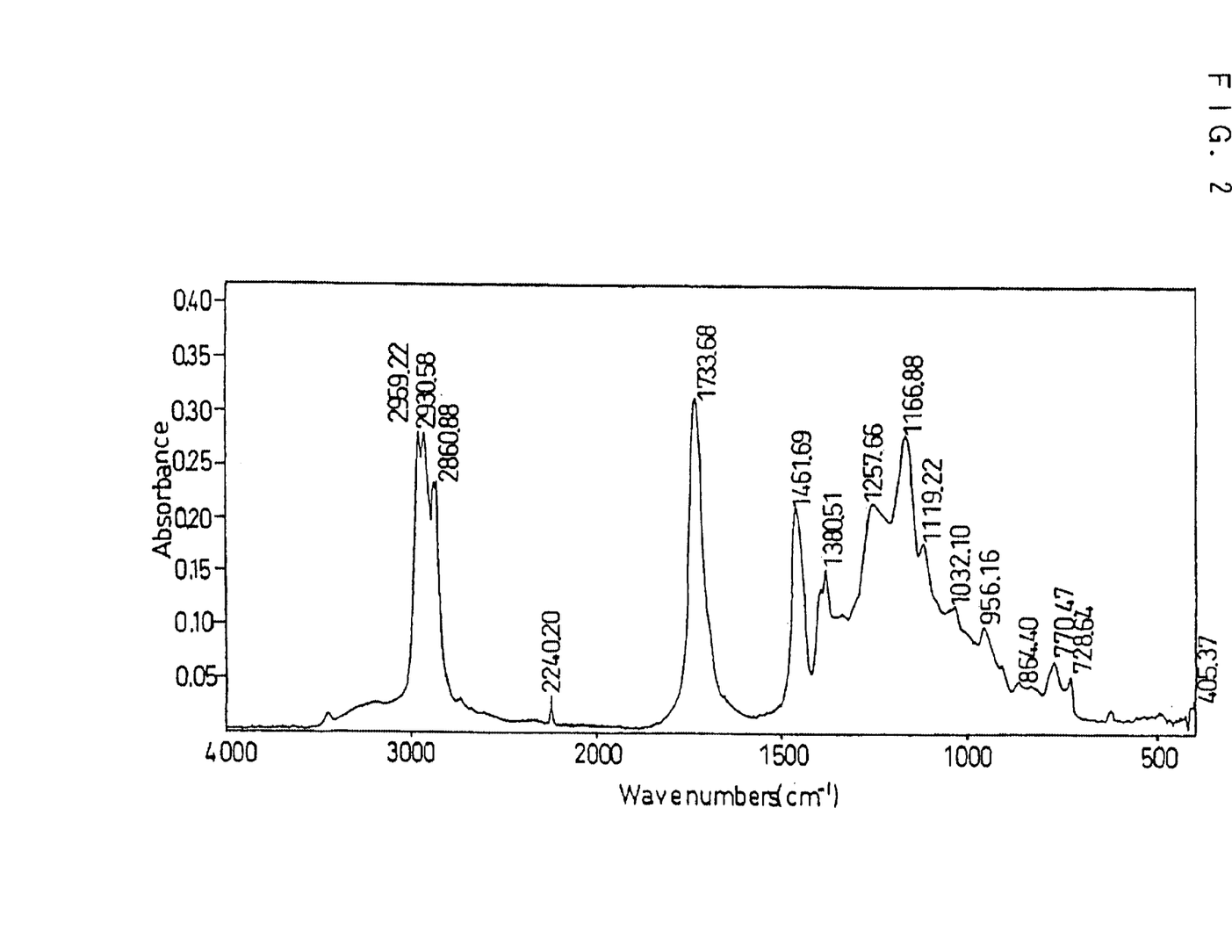
FIG. 2 is an absorption spectrum obtained by FT-IR spectrometry of an example of a particulate binder.

As the particulate binder, this example used an elastic copolymer comprising a 2-ethylhexylacrylate unit, an acrylic acid unit and an acrylonitrile unit (BM500B, manufactured by Nippon Zeon Co., Ltd.). FIG. 2 shows an absorption spectrum of BM500B obtained by the FT-IR spectrometry.

In FIG. 2, the absorption peak observed near 2240 $cm^{-1}$ is attributed to the C≡N stretching vibration in the acrylonitrile unit, while the absorption peak observed near 1733 $cm^{-1}$ is attributed to the C═O stretching vibration in the 2-ethylhexylacrylate unit and the acrylic acid unit. The intensity of the absorption peak attributed to the C═O stretching vibration in the 2-ethylhexylacrylate unit and the acrylic acid unit is about 10 times the intensity of the absorption peak attributed to the C≡N stretching vibration in the acrylonitrile unit.

The absorption spectrum was obtained by the FT-IR spectrometry under the following conditions:

Number of sample scans: 32

Number of background scans: 32

Resolution: 4000

Sample gain: 1.0

Spectroscopic apparatus: microscopic FT-IR (Continu μm, manufactured by Nicolet Instrument Corp.)

Light source: AVATAR-360

A sample for the spectrometry was prepared by dissolving the particulate binder in N-methyl-2-pyrrolidone, applying the obtained solution to a KBr plate, and drying the plate.

As the thickening agent, a copolymer comprising an ethylene unit and a vinyl alcohol unit (BM700H, manufactured by Nippon Zeon Co., Ltd.) was used.

Figure 3:
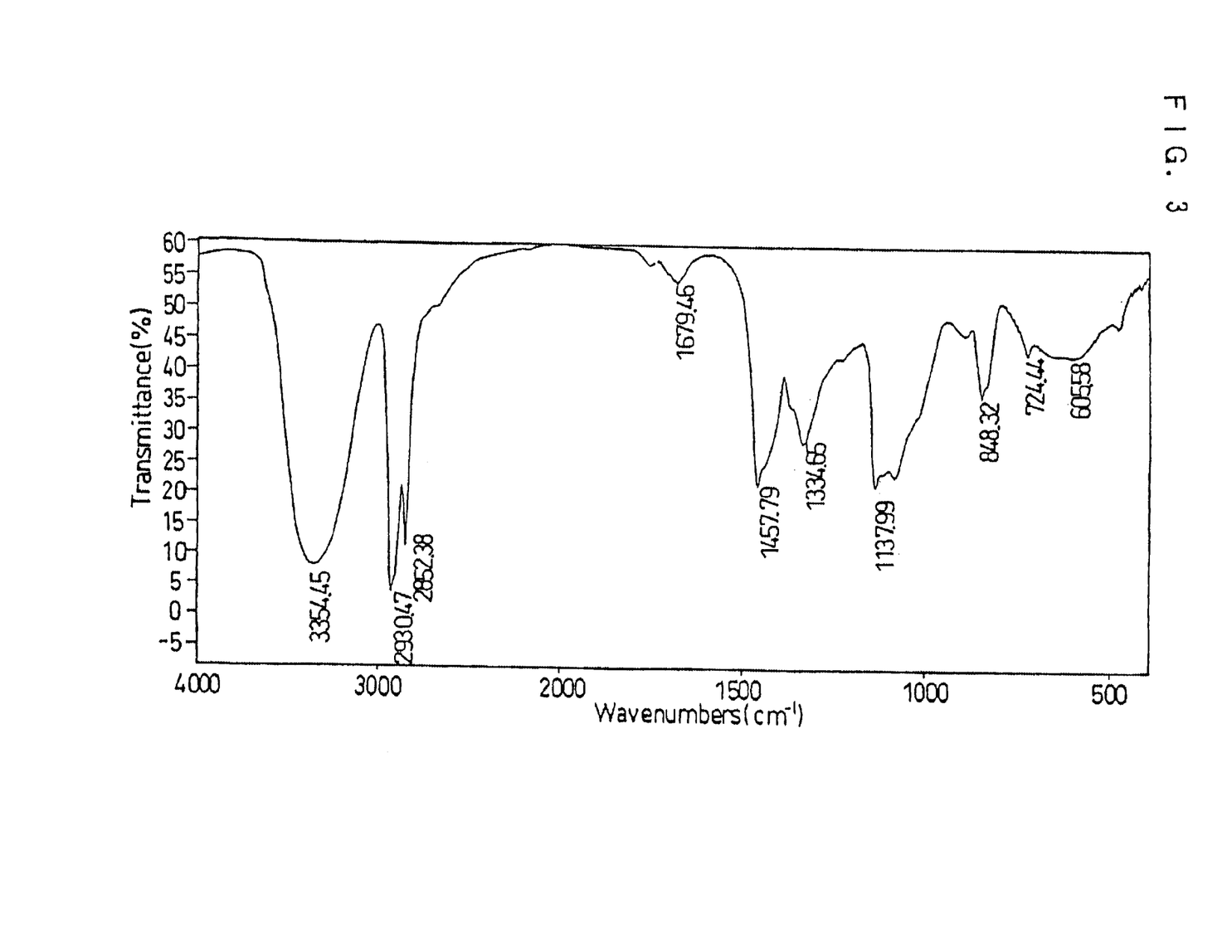
FIG. 3 is a transmission spectrum obtained by FT-IR spectrometry of an example of a thickening agent.

FIG. 3 shows a transmission spectrum of BM700H obtained by the FT-IR spectrometry. The conditions of the spectrometry of BM700H were the same as those of BM500B. In FIG. 3, two absorption peaks observed near 2852 $cm^{-1}$ and 2930 $cm^{-1}$ are attributed to OH group of the vinyl alcohol unit bonded to the ethylene unit.

The above-described positive electrode mixture paste was applied to both surfaces of an aluminum foil having a thickness of 20 μm, rolled such that the density of $LiCoO_2$ in the positive electrode mixture became 3.5 g/ml, and cut to a size of 4 cm in width and 46 cm in length, to obtain a positive electrode sheet. The density of $LiCoO_2$ was calculated by dividing the weight of $LiCoO_2$ in the positive electrode mixture by the volume of the positive electrode mixture. A lead made of the same material as that of the core member was connected to the positive electrode sheet.

Meanwhile, 100 parts by weight of spherical artificial graphite, 3 parts by weight of stylene-butadiene rubber (SBR), and 1.3 parts by weight of carboxymethyl cellulose were blended together, thereby to produce a negative electrode mixture paste.

The negative electrode mixture paste was applied to both surfaces of a core member made of 15 μm thick copper foil, rolled to a thickness of 140 μm, and cut to a predetermined length, to produce a negative electrode sheet. A lead made of the same material as that of the core member was connected to the negative electrode sheet.

The positive electrode sheet and the negative electrode sheet obtained in the above manner were wound with a separator interposed therebetween, to produce an electrode assembly. A polyethylene micro-porous film having a thickness of 27 μm was used as the separator. The wound electrode assembly was compressed in diametrical direction to have a substantially elliptic transverse-section. The ratio of the longer axis to the shorter axis in the substantially elliptic transverse-section was 6.3.

The electrode assembly was accommodated in a predetermined aluminum case with insulating rings placed on the top and bottom surfaces of the electrode assembly with 3.2 g of a non-aqueous electrolyte. The non-aqueous electrolyte was prepared by dissolving $LiPF_6$ in a mixture of equal volumes of ethylene carbonate and ethylmethyl carbonate at a concentration of 1 mole/liter. The leads of the negative and positive electrode sheets were connected to predetermined positions, respectively. Then, the opening of the case was sealed with a sealing plate, to produce a rectangular battery "A". The battery "A" had dimensions of 30 mm in width, 48 mm in height, and 5 mm in thickness, and had a nominal capacity of 600 mAh.

Next, the positive electrode sheet and the battery thus produced were evaluated in the following points:

(1) Evaluation of the Positive Electrode Sheet (i) Critical oblateness

The positive electrode sheet was wound one turn into a cylinder having a diameter of 8 cm. Then, a pressure perpendicular to the side face of the cylinder was applied until the cylinder cracked. The ratio of the longer axis to the shorter axis in the substantially elliptic section at the bottom of the cylinder upon the occurrence of cracking was obtained as critical oblateness. The result is shown in Table 1.

(ii) Contact angle

The contact angle between the surface of the positive electrode sheet and the above-mentioned non-aqueous electrolyte was obtained at 25° C. The contact angle was measured 30 seconds after 0.2 ml of the non-aqueous electrolyte was dropped on the surface of the positive electrode sheet. The result is shown in Table 1.

(2) Evaluation of the Battery (i) High-rate discharge characteristic

The battery was charged at 600 mA until the battery voltage reached 4.2 V and was then discharged at 120 mA until the battery voltage decreased to 3 V. Next, the battery was charged at 600 mA until the battery voltage reached 4.2 V and was then discharged at 1200 mA until the battery voltage decreased to 3 V. The ratio of the discharge capacity at 1200 mA discharge to that at 120 mA discharge was obtained. The result expressed as a percentage is shown in Table 1.

(ii) Capacity maintenance rate

The operation of charging the battery until the battery voltage reached 4.2 V at 600 mA and then discharging the battery until the battery voltage decreased to 3 V at 600 mA was repeated 100 times. The ratio of the discharge capacity at the 100th operation to that at the first operation was calculated. The result expressed as a percentage is shown in Table 1.

in the same manner as in EXAMPLE 1. The results are shown in Table 1.

Table 1 shows that when the amount of the particulate binder in the positive electrode mixture is 0.4 or more part by weight per 100 parts by weight of the active material, a battery having an excellent high-rate discharge characteristic and long life can be obtained. When the amount of the particulate binder is 2 or more parts by weight, the high-rate discharge characteristic deteriorates slightly, thereby indicating that 0.4 to 2 parts by weight, particularly 0.4 to 1 part by weight, is preferable.

Comparative Example 1

Positive electrode sheets "M" to "O" and batteries "M" to "O" were produced in the same manner as in EXAMPLE 1,

TABLE 1

| Example No. | Battery | Binder | Amount of binder (part(s) by weight) | Active material density (g/ml) | Critical oblateness | Contact angle (°) | High-rate discharge characteristic (%) | Capacity maintenance rate (%) |
|---|---|---|---|---|---|---|---|---|
| 1 | A | BM500B | 0.5 | 3.5 | 2.63 | 25.5 | 97.1 | 91.9 |
| 2 | B | | 0.5 | 2.9 | 1.99 | 19.9 | 98 | 84.2 |
| | C | | 0.5 | 3.2 | 2.06 | 22.3 | 97.9 | 87.9 |
| | D | | 0.5 | 3.3 | 2.27 | 23.1 | 97.4 | 90 |
| | E | | 0.5 | 3.7 | 2.99 | 27.1 | 97.5 | 92.6 |
| | F | | 0.5 | 4 | 3.24 | 29.8 | 97.3 | 92.9 |
| | G | | 0.5 | 4.2 | 3.35 | 34.6 | 83.2 | 84.8 |
| 3 | H | | 0.4 | 3.4 | 2.28 | 22.1 | 97 | 89.4 |
| | I | | 0.5 | 3.4 | 2.41 | 24.2 | 97.3 | 91.1 |
| | J | | 0.8 | 3.4 | 2.48 | 27.4 | 95.3 | 91.7 |
| | K | | 1 | 3.4 | 2.67 | 29.2 | 92.2 | 92.3 |
| | L | | 2 | 3.4 | 2.87 | 32.2 | 87.1 | 92.3 |
| Comparative example 1 | M | PVDF | 4 | 3.4 | 1.65 | 9.2 | 65.9 | Not measured |
| | N | | 4 | 3.3 | 2.06 | 6.8 | 83.4 | 88.5 |
| | O | | 4 | 3.2 | 1.95 | 4.9 | 84.2 | 87.6 |

EXAMPLE 2

Positive electrode sheets "B" to "G" and batteries "B" to "G" were produced in the same manner as in EXAMPLE 1, except that the density of the active material $LiCoO_2$ in the positive electrode mixture was varied as shown in Table 1. These positive electrode sheets and batteries were evaluated in the same manner as in EXAMPLE 1. The results are shown in Table 1.

Table 1 shows that when the active material density is 2.9 g/ml, a battery having a sufficient life cannot be obtained and that when the active material density is 4.2 g/ml, each of the characteristics as shown in the Table 1 deteriorates. Also, it is considered that when the active material density is too high, the positive electrode sheet is prone to collapse. This indicates that the suitable range of the active material density is 3.0 to 4.0 g/ml. Further, Table 1 shows that 3.4 to 3.7 g/ml is more preferable as the range of the active material density. In Table 1, as the active material density is higher, the oblateness upon the occurrence of cracking uniquely tends to become higher, so that it can be expected to obtain a positive electrode sheet well suited for small-sized, high-capacity rectangular batteries.

EXAMPLE 3

Positive electrode sheets "H" to "L" and batteries "H" to "L" were produced in the same manner as in EXAMPLE 1, except that the amount of the binder in the positive electrode mixture was varied as shown in Table 1 and that the density of the active material $LiCoO_2$ was adjusted to 3.4 g/ml. These positive electrode sheets and batteries were evaluated except that PVDF was used as the binder of the positive electrode mixture in place of BM500B, that the thickening agent was not used, and that the density of the active material $LiCoO_2$ was varied as shown in Table 1. These positive electrode sheets and batteries were evaluated in the same manner as in EXAMPLE 1. The results are shown in Table 1.

The ability of PVDF to bind the active material is so weak that about 4 parts by weight of PVDF is required per 100 parts by weight of the active material for producing the positive electrode sheets. Table 1 shows that the positive electrode sheets "M" to "O" are brittle and are prone to crack although they include such a large amount of the binder. Also, the contact angles of Table 1 indicate that in the batteries "M" to "O", the permeability of the non-aqueous electrolyte into the positive electrode mixture is too high, thereby causing the non-aqueous electrolyte to be distributed unevenly inside the battery. This is considered as the cause of low high-rate discharge characteristic. On the contrary, in Table 1, most of the batteries of the examples in accordance with the present invention have an appropriate contact angle of 10 to 30°.

EXAMPLE 4

One hundred parts by weight of the active material $LiCoO_2$, 0.4 part by weight of BM500B, 0.3 part by weight of BM700H, 1.5 parts by weight of graphite having a mean particle size of 0.3 µm, 1.5 parts by weight of acetylene black having a mean particle size of 0.03 µm, and a proper amount of N-methyl-2-pyrrolidone were blended together, to obtain a positive electrode mixture paste with a solid content of 28 wt %. By using this positive electrode mixture paste, a positive electrode sheet "a" and a battery "a" were produced in the same manner as in EXAMPLE 1, except that the active material density was adjusted to 3.6 g/ml.

Next, the positive electrode sheet and battery thus produced were evaluated in the following points:
(1) Evaluation of the Positive Electrode Sheet
  (i) Coming-off of the positive electrode mixture
  For the production of the positive electrode sheet, the positive electrode mixture paste was applied to the aluminum foil and dried. Herein, whether or not the positive electrode mixture came off from the aluminum foil was examined. The result is shown in Table 2.
  (ii) State of the electrode surface
  The surface of the positive electrode sheet was examined after the fabrication of the electrode assembly. The result is shown in Table 2.
(2) Evaluation of the Battery
  (i) Capacity maintenance rate
  The operation of charging the battery until the battery voltage reached 4.2 V at 600 mA and then discharging the battery until the battery voltage decreased to 3 V at 600 mA was repeated 200 times. The ratio of the discharge capacity at the 200th operation to that at the first operation was calculated. The result expressed as a percentage is shown in Table 2.

electrode sheets and batteries were evaluated in the same manner as in EXAMPLE 4. The results are shown in Table 2.

When the amount of the binder was too small as in the battery "e", the positive electrode mixture came off from the core member, while the amount of the binder was too large as in the battery "f", the capacity maintenance rate deteriorated since the positive electrode sheet did not have sufficient electronic conductivity. This indicates that the optimal range of the binder is 0.4 to 2 parts by weight per 100 parts by weight of the active material.

EXAMPLE 6

Positive electrode sheets "g" to "j" and batteries "g" to "j" were produced in the same manner as in EXAMPLE 4, except that the weight ratio of graphite/acetylene black was varied as shown in Table 2 without changing the total amount of the conductive agent in the positive electrode mixture. These positive electrode sheets and batteries were evaluated in the same manner as in EXAMPLE 4. The results are shown in Table 2.

The battery "i" with the graphite/acetylene black weight ratio of 10/90 and the battery "j" with the ratio of 90/10 exhibited a reduced capacity maintenance rate. The reason is considered that these batteries do not have a close electro-conductive network because the positive electrode sheet "i" is lacking in graphite and the positive electrode sheet "j" is

TABLE 2

| | | Binder | | Conductive agent | | | | |
| | | | Amount of binder (part(s) by weight) | Graphite (part(s) by weight) | Acetylene black (part(s) by weight) | Coming-off of positive electrode mixture | State of positive electrode surface | Capacity maintenance rate (%) |
| Example No. | Battery | Kind | | | | | | |
| --- | --- | --- | --- | --- | --- | --- | --- | --- |
| 4 | a | BM500B | 0.4 | 1.5 | 1.5 | Not found | Normal | 92.6 |
| 5 | b | | 0.6 | | | | | 92.1 |
| | c | | 1.2 | | | | | 91.2 |
| | d | | 2.0 | | | | | 90.1 |
| | e | | 0.3 | | | Found | — | — |
| | f | | 2.5 | | | Not found | Normal | 82.1 |
| 6 | g | | 0.6 | 0.6 | 2.4 | | | 89.3 |
| | h | | | 2.4 | 0.6 | | | 88.9 |
| | i | | | 0.3 | 2.7 | | | 81.8 |
| | j | | | 2.7 | 0.3 | | | 82.3 |
| 7 | k | | | 1 | 1 | | | 89.5 |
| | l | | | 1.9 | 1.9 | | | 93.3 |
| | m | | | 0.8 | 0.8 | | | 81.4 |
| | n | | | 2.0 | 2.0 | | Minute cracking | 93.1 |
| | o | | | 2.3 | 2.3 | | Cracking | — |
| 8 | p | FEP | 2.0 | 1.5 | 1.5 | | Normal | 89.5 |
| Comparative example 2 | q | PVDF | 4.0 | 1.5 | 1.5 | | Cracking | — |

The positive electrode "a" contains a small amount of BM500B as the binder, and BM500B functions fully as the binder even in a small amount. Thus, the active material density could be adjusted to 3.6 g/ml while sufficient porosity was secured. Also, the positive electrode "a" exhibited no trouble. The capacity maintenance rate of the battery "a" was also favorable.

EXAMPLE 5

Positive electrode sheets "b" to "f" and batteries "b" to "f" were produced in the same manner as in EXAMPLE 4, except that the amount of the binder in the positive electrode mixture was varied as shown in Table 2. These positive lacking in acetylene black. Thus, this indicates that the optimal range of the graphite/acetylene black weight ratio is 20/80 to 80/20.

EXAMPLE 7

Positive electrode sheets "k" to "o" and batteries "k" to "o" were produced in the same manner as in EXAMPLE 4, except that the total amount of the conductive agent was varied as shown in Table 2 without changing the weight ratio of graphite/acetylene black of the conductive agent in the positive electrode mixture. These positive electrode sheets and batteries were evaluated in the same manner as in EXAMPLE 4. The results are shown in Table 2.

The battery "m" having the positive electrode sheet "m" containing only 1.6 parts by weight of the conductive agent per 100 parts by weight of the active material had a reduced capacity maintenance rate because of insufficient electronic conductivity in the positive electrode sheet. With respect to the positive electrode sheet "n" containing 4 parts by weight of the conductive agent per 100 parts by weight of the active material, cracking was found when the electrode assembly was fabricated, although the cracking was minute. The capacity maintenance rate of the battery "n" was equivalent to that of the battery "a". However, the positive electrode sheet "o" containing 4.6 parts by weight of the conductive agent per 100 parts by weight of the active material exhibited cracking equivalent to that of a battery "q" of the comparative example which will be described later. This indicates that the optimal range of the conductive agent is not less than 2 and less than 4 parts by weight per 100 parts by weight of the active material.

EXAMPLE 8

A positive electrode sheet "p" and a battery "p" were produced in the same manner as in the battery "d", except that FEP was used as the binder in place of BM500B, that carboxymethyl cellulose was used as the thickening agent in place of BM700H, and that the amount of carboxymethyl cellulose was 1 part by weight per 100 parts by weight of the active material. The positive electrode and battery thus produced were evaluated in the same manner as in EXAMPLE 4. The results are shown in Table 2.

The battery "p" having the positive electrode sheet "p" containing FEP as the binder had a capacity maintenance rate slightly lower than that of the battery "a", but it exhibited no trouble.

Comparative Example 2

A positive electrode sheet "q" and a battery "q" were produced in the same manner as in EXAMPLE 4, except that PVDF was used as the binder, that the amount of PVDF was 4 parts by weight per 100 parts by weight of the active material, and that the thickening agent was not used. The positive electrode sheet and battery thus produced were evaluated in the same manner as in EXAMPLE 4. The results are shown in Table 2.

The positive electrode sheet "q" containing PVDF soluble in N-methyl-2-pyrrolidone as the binder developed cracking at a portion having the highest curvature after the electrode assembly was fabricated. This is presumably because the positive electrode sheet "q", containing a large amount of PVDF as the binder, had a reduced porosity and thereby the flexibility of the electrode was greatly impaired. Meanwhile, it was confirmed that no cracking occurred when the active material density was reduced to 3.3 g/ml. However, reduction in the active material density results in an increase in thickness of the electrode sheet. Thus, the length of the positive electrode sheet needs to be reduced in order for the thickened electrode to be accommodated in the metallic battery case.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A non-aqueous electrolyte secondary battery comprising: a positive electrode sheet comprising a positive electrode mixture containing a lithium-containing transition metal oxide as an active material and a particulate binder; a negative electrode sheet comprising a negative electrode mixture containing a carbon material; a separator interposed between said positive electrode sheet and said negative electrode sheet; and a non-aqueous electrolyte containing a lithium salt, wherein said positive electrode sheet and said negative electrode sheet are wound with said separator interposed therebetween to form an electrode assembly, and said positive electrode mixture has an active material density of 3.0 to 4.0 g/ml.

2. The non-aqueous electrolyte secondary battery in accordance with claim 1, wherein said electrode assembly has a substantially elliptic transverse-section.

3. The non-aqueous electrolyte secondary battery in accordance with claim 2, wherein a ratio of the longer axis to the shorter axis in said substantially elliptic transverse-section is 4 to 10.

4. The non-aqueous electrolyte secondary battery in accordance with claim 1, wherein said particulate binder is an elastic copolymer comprising a 2-ethylhexylacrylate unit, an acrylic acid unit, and an acrylonitrile unit.

5. The non-aqueous electrolyte secondary battery in accordance with claim 4, wherein in an absorption spectrum obtained by an FT-IR spectrometry of said elastic copolymer, an intensity of an absorption peak attributed to C=O stretching vibration in said 2-ethylhexylacrylate unit and said acrylic acid unit is 3 to 50 times an intensity of an absorption peak attributed to C≡N stretching vibration in said acrylonitrile unit.

6. The non-aqueous electrolyte secondary battery in accordance with claim 1, wherein said positive electrode mixture contains 0.4 to 2 parts by weight of said particulate binder per 100 parts by weight of said lithium-containing transition metal oxide.

7. The non-aqueous electrolyte secondary battery in accordance with claim 6, wherein said positive electrode mixture further contains not less than 2 and less than 4 parts by weight of a conductive agent comprising graphite (A) and carbon black (B) per 100 parts by weight of said lithium-containing transition metal oxide, and a weight ratio of (A)/(B) in said conductive agent is 20/80 to 80/20.

8. The non-aqueous electrolyte secondary battery in accordance with claim 1, wherein said positive electrode mixture further contains a thickening agent having a polyethylene structure.

9. A positive electrode for a non-aqueous electrolyte secondary battery comprising a positive electrode mixture containing 100 parts by weight of a lithium-containing transition metal oxide, 0.4 to 2 parts by weight of a particulate binder, and not less than 2 and less than 4 parts by weight of a conductive agent, wherein said positive electrode mixture has an active material density of 3.0 to 4.0 g/ml, said conductive agent comprises graphite (A) and carbon black (B), and a weight ratio of (A)/(B) is 20/80 to 80/20.

10. The non-aqueous electrolyte secondary battery in accordance with claim 1, wherein the particulate binder is an elastic copolymer comprising a core-shell type rubber particle composed of a core comprising an acrylonitrile unit and a flexible shell comprising a 2- ethylhexylacrylate unit.

* * * * *